Figure 1:
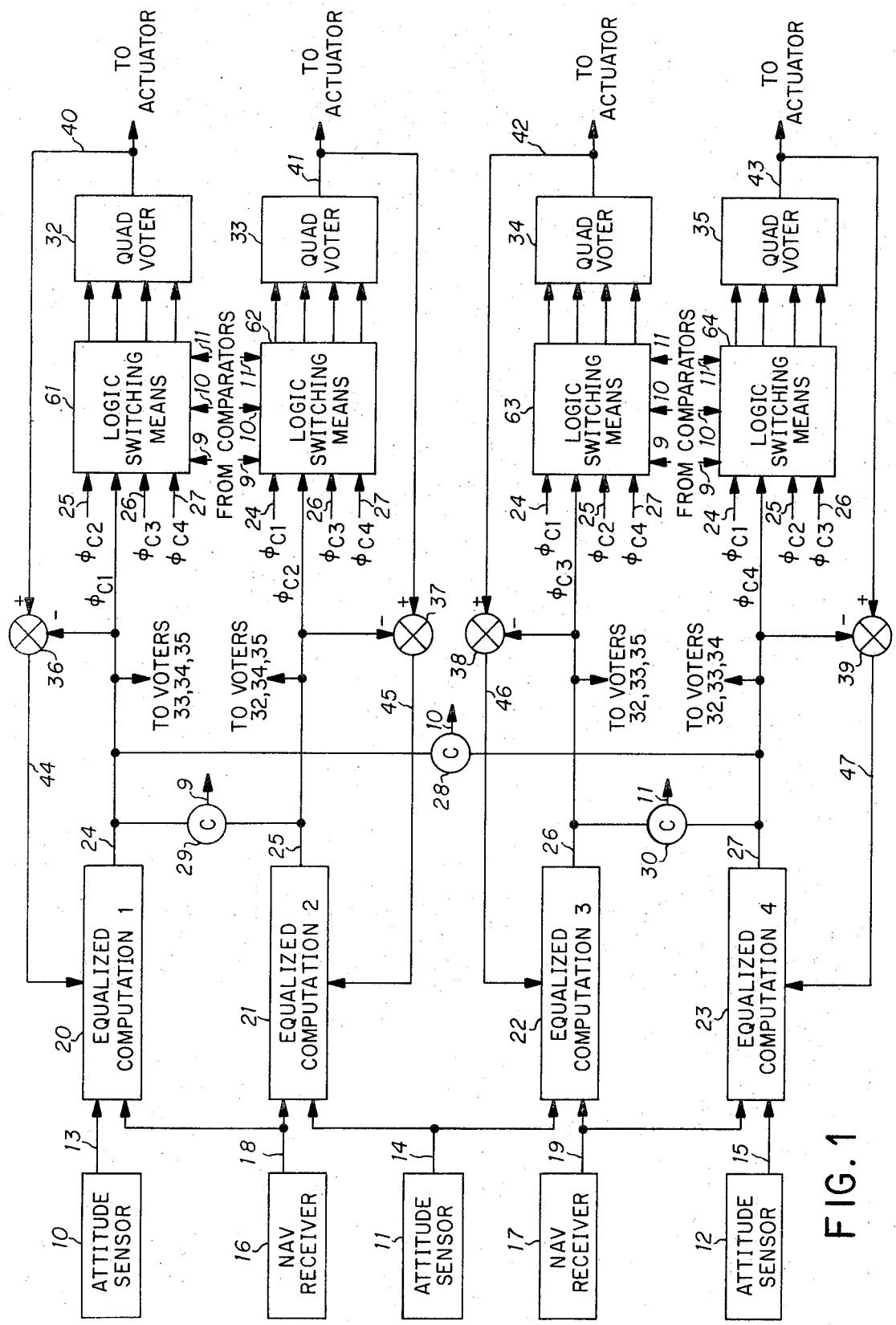

United States Patent [19]
Foster et al.

[11] 3,805,235
[45] Apr. 16, 1974

[54] EQUALIZATION MEANS FOR MULTI-CHANNEL REDUNDANT CONTROL SYSTEM

[75] Inventors: Jimmie J. L. Foster; Elmer J. Schultz, both of Marion, Iowa

[73] Assignee: Collins Radio Company, Dallas, Tex.

[22] Filed: Dec. 26, 1972

[21] Appl. No.: 317,897

[52] U.S. Cl. 340/146.1 BE, 235/153 AE, 244/77 M
[51] Int. Cl. ........................................... G06f 11/00
[58] Field of Search ..... 340/146.1 BE; 235/153 AE, 235/150.2; 244/77 M, 77 R; 307/219; 318/564

[56] References Cited
UNITED STATES PATENTS

| | | | |
|---|---|---|---|
| 3,708,735 | 1/1973 | Barltrop | 244/77 M |
| 3,351,315 | 11/1967 | Carson et al. | 340/146.1 BE |
| 3,401,904 | 9/1968 | Nelson | 244/77 M |
| 3,667,057 | 5/1972 | Pfersch, Jr. et al. | 307/219 |
| 3,670,148 | 6/1972 | Moses | 340/146.1 BE |
| 3,698,665 | 10/1972 | Schenbeck | 244/77 M |

Primary Examiner—Charles E. Atkinson
Attorney, Agent, or Firm—Richard W. Anderson; Robert J. Crawford

[57] ABSTRACT

An equalization means for a multi-channel redundant command signal computation control system where each channel output is applied to an associated one of a plurality of output signal voting means to which all other channel outputs are also applied for logically best signal selection. Each computation is equalized on the basis of the discrepancy between its output and that of the associated voting means.

5 Claims, 2 Drawing Figures

EQUALIZATION MEANS FOR MULTI-CHANNEL REDUNDANT CONTROL SYSTEM

This invention relates generally to vehicular control systems and more particularly to control systems of the type employing a plurality of command signal computation channels from which one command signal is selected for ultimate control as the logically best one of a plurality of the independently or quasi-independently computed command signals.

Redundant control systems are known to employ means for electing a logically best one of a plurality of command signal computations for ultimate control and may, for example, employ a system of command signal voting as defined in U.S. Pat. No. 3,596,107 to Richard L. Kittrell entitled, Signal Selector, assigned to the assignee of the present invention.

As described in Kittrell U.S. Pat. No. 3,596,107, a logic voting means may be employed to select a particular mid-value one of a plurality of computations, so as to preclude ultimate system control under the influence of any command computation which may be experiencing a hard-over condition either by input sensor or computation failure.

As defined in Kittrell U.S. Pat. No. 3,596,107, such voting systems may employ a comparison means which operates to determine when the discrepancy between command signals in predetermined pairs of computation channels exceed a predetermined threshold, and, on the basis of this comparison, effect a disconnect of a logically "bad" channel.

Therefore in systems such as defined in Kittrell U.S. Pat. No. 3,596,107, nuisance disconnects and mode cycling may be experienced if the comparator thresholds are too tight. On the other hand, a wide comparator threshold level may permit undesirably large step inputs to be cycled into the ensuing control system actuation means, and, in the case of automatic control systems for aircraft, these thresholds must necessarily be held to a minimum.

For these reasons, redundant control systems have employed equalization means which, in one manner or another, force the plurality of computation channels to track, and thus permit tighter comparator thresholds. One such equalization means, for example, comprises the known expedient of cross-feed between channels such that the ultimate command signal becomes an average, of sorts, of the individual command signal computations.

The object of the present invention is to provide an improved equalization means for a multi-channel redundant control system of a type employing command signal voting means to select a logically best one of the plurality of commuted command signals, wherein tighter comparator thresholds are permitted so as to minimize nuisance disconnects, while, at the same time, minimizing threshold levels permitted to pass as step inputs into the system actuator arrangement.

The present invention is featured in the provision of employing equalization means around the voters in a multi-channel redundant control system. Equalization around voters forces each of a plurality of a redundant command signal computations to track a voted best one of said signals by equalizing each computation on the basis of the discrepancy between that computation and the elected one of the plurality of such computations. The advantages of equalizing around voters may be summarized as follows:

1. Equalization around voters washes out installation errors, known offsets, and biases that are introduced downstream of the equalization integrator.
2. Tolerance errors of sensors and computations downstream of the equalization integrator are washed out of the computation.
3. Equalization around voters permits voters to select the sensor upstream of the equalization integrator that has the smallest static error, and the redundant equalization paths store up the remaining sensor static errors.
4. Equalization paths can be appropriately limited to avoid masking faulty sensors or computations.
5. Equalization around voters permits more time to equalize up to the established limit and then, assuming a fault is present, still allows adequate delay on comparator trips to avoid unacceptable disconnect rates.
6. Equalization allows tighter thresholds to be used on comparators, since normal operational tolerances are washed out and hence do not appear at the comparators (i.e., tighter tracking of redundant paths is possible).
7. Equalization, in the fault free case, tends to group all of the plurality of voter inputs closer together, which becomes a real advantage when the voter is caused to switch, in a fault case, to a mid-value configuration, because then limit cycle tendency is minimized.

Figure 2:
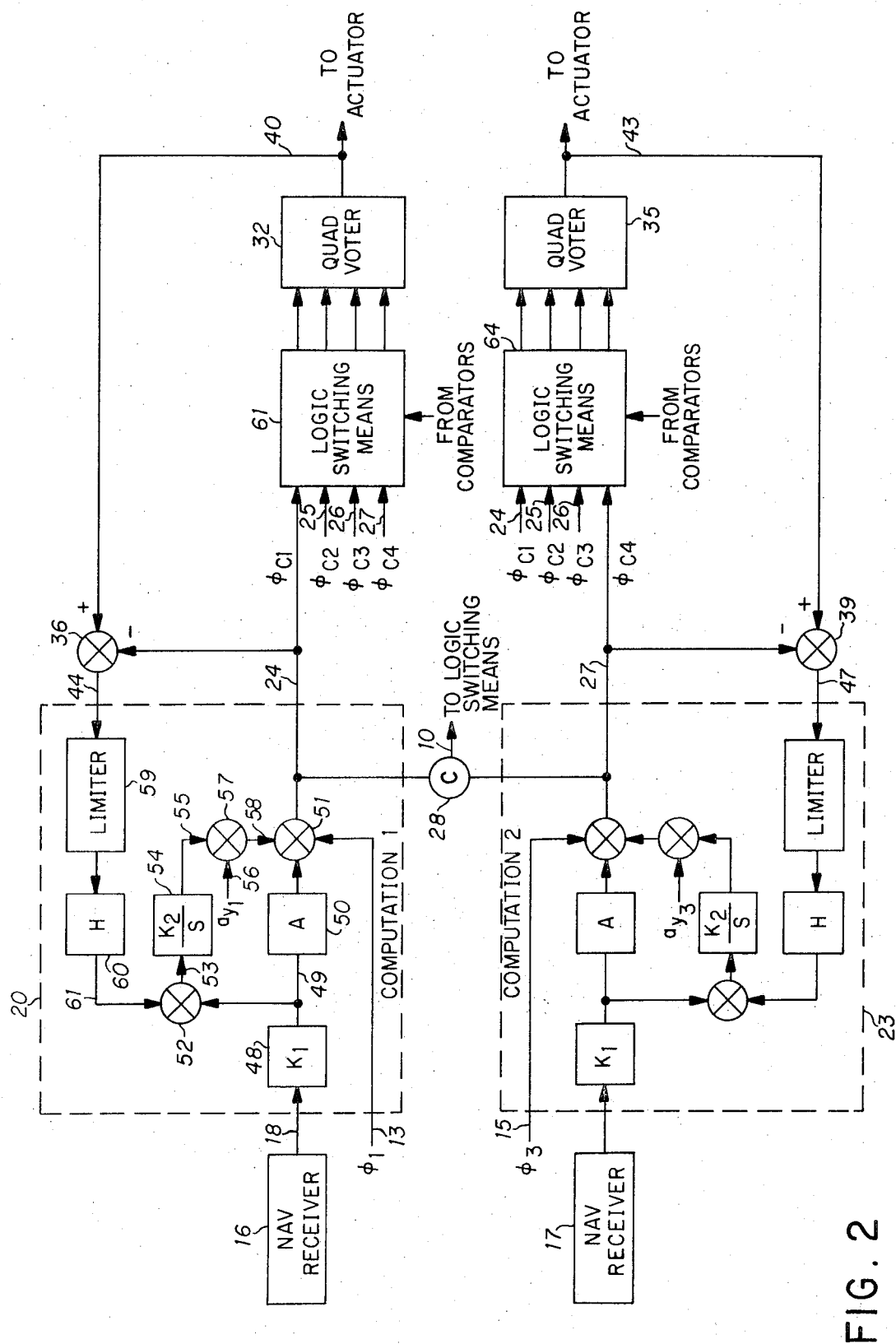

These and other features, objects and advantages of the present invention will be apparent upon reading the following description with reference to the accompanying drawings in which;

FIG. 1 is a functional block diagram of a multi-channel redundant computation system employing equalization around output voters in accordance with the present invention; and FIG. 2 is a diagram illustrating the equalization principle of the present invention as it applies to an exampled pair of compared computations in the system of FIG. 1.

As above discussed, the present invention forces each of a plurality of redundant computation channels in a multi-channel control system to track, so as to permit tighter comparator thresholds and yet minimize nuisance disconnects. It is to be emphasized that a multi-channel control system of the type employing plural command signal computations with means for selecting a logically best one for ultimate system control, and including means (comparators) for eliminating from the voting process a logically "bad" one or ones of the several computations, would not provide acceptable aircraft control performance in the absence of some means for causing the computations to track, since the selection of any workable comparator threshold, in the absence of such equalization means, may be virtually impossible due to the cascading of input sensor tolerances with computation tolerances. For example, the employment of comparators at the computation output per se in such a system could cause nuisance disconnects if set too low or intolerable aircraft responses if the stackup of tolerances dictate large comparator threshold levels. The employment of tight comparator threshold levels to minimize step inputs and intolerable aircraft responses in such systems may, due to sensor tolerances themselves, cause nuisance disconnects. The present invention will be seen to permit a highly advantageous compromise by providing a system permitting desirable tight comparator thresholds while at the same time eliminating nuisance disconnects.

For purposes of example and not by way of limitation, the equalization scheme of the present invention will be defined as it might be applied to a four-channel redundant computation control system as employed for lateral axis control of an aircraft. As depicted in FIG. 1, four channels of computation may be employed. A first channel computation 20 receives an input 13 from an attitude sensor 10 and an input 18 from a first navigation receiver 16 and computes an output command signal 24, designated $\phi_{C1}$. For example, attitude sensor 10 might comprise a bank gyro and navigation receiver 16 might comprise a localizer receiver and the output 24 from computation 20 might comprise a bank command signal for lateral axis control of an aircraft.

Similarly, a second computation channel 21 might receive an input 18 from navigation receiver 16 along with an input 14 from a further attitude sensor 11, and from these inputs compute a second bank command signal 25, designated $\phi_{C2}$.

A third computation channel 22 might receive an input 19 from a further navigation receiver 17 and an input 14 from attitude sensor 11 to compute a third bank command signal 26, designated $\phi_{C3}$.

In similar fashion, a fourth computation channel 23 might receive an input 19 from navigation receiver 17 and an input 15 from a still further attitude sensor 12, and from these inputs compute a fourth bank command signal 27, designated $\phi_{C4}$.

The system of FIG. 1, as thus described, developes four bank command signals 24, 25, 26, and 27 via quasi-independent computations from three attitude sensors 10, 11, and 12 and a pair of navigation receivers 16 and 17.

Bank command signal $\phi_{C1}$ from computation 20 is applied as an input through respective logic switching means 61, 62, 63 and 64 to each of four quad voters 32, 33, 34, 35, as are the second, third and fourth bank command signals $\phi_{C2}$, $\phi_{C3}$, and $\phi_{C4}$. As defined in Kittrell U.S. Pat. No. 3,596,107, each of the quad voters 32–35 might select a logically best mid-value one of the four inputs $\phi_{C1}$ - $\phi_{C4}$ applied thereto.

According to the present invention, the elected output of each of the quad voters 32–35 is compared with respective different ones of the computation channel outputs $\phi_1$-$\phi_4$ for equalization purposes.

For purposes of equalizing computation channel 20, the $\phi_{C1}$ output 24 is compared with the voted output 40 of quad voter 32 in signal comparing means 36 to develop an equalization input 44 to channel 20 which comprises the discrepancy between $\phi_{C1}$ and the elected output 40. Similarly, the $\phi_{C2}$ output 25 from computation channel 21 is compared in comparison means 37 with the elected output 41 from quad voter 33 to develop an equalization input 45 to channel 21. The $\phi_{C3}$ output 26 from computation channel 22 is compared in comparison means 38 with the elected output 42 from quad voter 34 to provide an equalization input 46 to channel 22 and the $\phi_{C4}$ output 27 from computation channel 23 is compared in comparison means 39 with the elected output 43 from quad voter 35 to provide an equalization input 47 to the computation channel 23.

The voted outputs 40, 41, 42, 43 from the four quad voters may be applied to the control system actuator means for lateral axis control.

The system generally depicted in FIG. 1 thus depicts a fail-operational computation system. When employing quad voters such as described in the above referenced Kittrell patent, whereby the system comparators may switch out from the voting logically determined "bad" ones of the command signals computed in the various channels, the voting process may revert to backup modes based on mid-value of three selection, and mid-value of three including system ground. Further, should the quad voters themselves be faulty, comparators associated with the quad voter output pairs may switch out equalization on the faulted quad voter and actuator driven thereby.

A pair of the computation channels of FIG. 1 are illustrated in association with a pair of quad voters to depict a typical equalized computation in accordance with the present invention. Each channel comprises a channel integrator means which, under the influence of an associated equalization input, causes the channel to track the elected or voted output channel.

With reference to FIG. 2, wherein only channels 1 and 4 are illustrated for purposes of explanation, computation channel 20 receives a primary displacement input 18 from navigation receiver 16. The displacement signal 18 is applied to a gain factor function 48 (K1) to provide an output 49 which is applied through a further gain means 50 (A) as input to signal combining means 51. The radio signal at 49 is additionally applied as a first input to a further signal combining means 52 which receives a second input 61 comprised of the equalization input 44 as applied through a limitor 59 and gain means 60 (H). The output 53 from signal combining means 52 is applied to a channel integrator 54, with the output 55 of the integrator being subsequently combined with the radio input signal in signal combining means 51.

As depicted in FIG. 2, the integrator output 55 might be applied to a further signal combining means 57 for combination with a lateral acceleration input 56, with the output 58 from this further signal combining means 57 being applied to signal combining means 51. Additionally, the attitude sensor input 13, which might comprise a bank attitude signal, is combined with the integrator and accelerometer outputs as well as the radio signal, with the output 24 from signal combining means 51 comprising a bank command signal $\phi_{C1}$ formulated from a radio displacement signal 18, a lateral acceleration signal 56 and a bank attitude signal 13 as additionally influenced or equalized in accordance with the discrepancy between the bank command signal $\phi_{C1}$ and the voted output 40 from quad voter 32.

The bank command signal $\phi_{C1}$ output 24 from channel 20 is thus equalized to track the elected output 40 from the quad voter 32. That is, assuming that the $\phi_{C4}$ input 27 to quad voter 32 is the logically best mid-value one appearing on the output 40 of the voter 32, the above defined equalization, based on the discrepancy between the elected output 40 (assumed to be $\phi_{C4}$) and the computed output 24 ($\phi_{C1}$) from the particular channel, forces $\phi_{C1}$ to track $\phi_{C4}$. Equalization in channel 20, as effected by the equalization signal 44, is limited by limiter 59 so that a fault will not be equalized.

That is, should the computed output 24 from channel 20, due to a sensor failure or computation error resulting from a fault in the channel 20 computation, vary from the quad voter output 40 in excess of a predetermined threshold, the channel 20 computation will not be forced to follow the voted output. Rather, the channel 20 computation $\phi_{C1}$, due to logic switching as defined in Kittrell U.S. Pat. No. 3,596,107 would be eliminated or switched-out from the voting functions. Thus equalization in channel 20, as in the remaining channels, is effected only in response to an associated equalization input which is not so extensive as to be indicative of a faulty channel computation but rather is indicative of a variation due to computation error, bias error and sensor standoff and tolerance errors.

The channel 4 computation 23 depicted in FIG. 2 is similarly equalized in accordance with an equalization input 47 which is defined as the discrepancy between the elected output 43 from the channel quad voter 35 and the channel 23 output computation 27 ($\phi_{C4}$). Thus, with the above assumption that $\phi_{C4}$ is the elected mid-value one of the four bank command computations applied to each of the quad voters, it is seen that the elected output 43 from quad voter 35 is the $\phi_{C4}$ input to that quad voter and, thus, channel 4 receives zero equalization input 47. Thus, that channel computation which is elected by the system quad voters is not equalized, while the remaining channels are caused to track the elected channel value.

With reference to FIG. 2, if the difference between bank command $\phi_{C1}$ and bank command $\phi_{C4}$, is represented by $\Delta\phi_C$, and this is the increment upon which on a comparator (for example, the comparator 28 of FIG. 2) will have to function, the $\phi_C$ increment may be related to an increment $\Delta Y$ which is the difference between the inputs from navigation receivers 16 and 17 and arrive at the following transfer function for the channel computation:

$$\frac{\Delta\phi_C}{\Delta Y} = \frac{K_1}{H} \cdot \frac{\frac{A}{K_2}S+1}{\frac{1}{HK_2}S+1} \quad (1)$$

From expression (1) it is seen that the steady state differential gain is represented by $K_1/H$, and the equalization time constant is represented by $1/HK_2$. Adjustment of these parameters may thereby result in a reduction of the effect of dynamic sensor errors as well as reducing the static errors of the navigation receivers, and computations upstream of the path integration. The steady state or static errors of the attitude sensors and those of the lateral accelerometers are washed out because they are downstream of the equalized path integrators.

The present invention thus provides an equalization means for a multi-channel redundant computation control system whereby tighter comparator thresholds may be employed with the attendant advantage of reduced limit-cycle oscillations while providing for washout of cascaded buildups of sensor tolerances and computation tolerances so as to minimize nuisance disconnects.

Although the present invention has been described with respect to a particular embodiment thereof it is not to be so limited as changes might be made therein which fall within the scope of the invention as defined in the appended claims.

We claim:

1. In a multi-channel redundant command signal control system comprising a plurality of N computation means by which a plurality of N command signals are redundantly computed and including N signal voting means to which each of said N command signals is applied and from each of which a predetermined one of said command signals is selected as an output control command; means for equalizing each of said N command signal computation means to track said predetermined one thereof as selected by an individual one of said signal voting means, said means for equalizing comprising signal comparison means in each said computation means for developing a difference signal proportional to the difference in magnitude between the command signal computed by that computation means and said predetermined one of said N command signals selected by said individual one of said signal voting means, and signal synchronization means in each said computation means being responsive to the difference signal related thereto to cause the command signal output from that computation means to track that predetermined one of said N command signals from which said related difference signal is formulated.

2. The system as defined in claim 1 wherein each said computation means comprises signal limiting means through which said related difference signal is applied to the signal synchronization means thereof.

3. The system as defined in claim 2 wherein each of said signal computation means comprises a displacement error signal source; said signal synchronization means comprising signal integrating means, first signal combining means, said first signal combining means receiving said displacement error signal and the related one of said difference signals as respective inputs thereto, the output of said first signal combining means applied to said signal integrating means, a second signal combining means, the output of said signal integrating means and said displacement error signal applied as respective inputs to said second signal combining means, and the output of said second signal combining means comprising said computed command signal equalized to track said related predetermined one of said plurality of computed command signals.

4. The system as defined in claim 3 comprising further input signals applied to each of said computation means porportional respectively to the rate of change of said displacement error signal and rate of change of velocity of said displacement error signal, and said second means for combining comprising means to combine said further input signals with the output of said signal integrating means and said displacement error signal, whereby steady state components of said further input signals are washed out of said computation channel command output signal on a long term basis.

5. The system as defined in claim 4 further comprising a plurality of signal comparator means each connected between the outputs of a predetermined different pair of said plurality of N computation means, each said signal comparator means providing an output in response to a predetermined amplitude discrepancy between input signals thereto, each of said signal voting means comprising logic switching means through which each of said plurality of N computed command signals are applied thereto, the outputs from said plurality of signal comparator means being applied to each said logic switching means, said logic switching means being responsive to outputs from predetermined ones of said signal comparators to preclude application of logically "bad" ones of said command signals to said plurality of signal voting means.

* * * * *

UNITED STATES PATENT OFFICE
CERTIFICATE OF CORRECTION

Patent No. 3,805,235                    Dated April 16, 1974

Inventor(s) Jimmie J. L. Foster and Elmer L. Schultz

It is certified that error appears in the above-identified patent and that said Letters Patent are hereby corrected as shown below:

Inventor "Elmer J. Schultz" should be --Elmer L. Schultz--.

Signed and sealed this 6th day of August 1974.

(SEAL)
Attest:

McCOY M. GIBSON, JR.            C. MARSHALL DANN
Attesting Officer               Commissioner of Patents